US008326484B2

(12) United States Patent
McGarry et al.

(10) Patent No.: US 8,326,484 B2
(45) Date of Patent: Dec. 4, 2012

(54) PROGRAMMABLE WIRELESS IN-LINE CONNECTOR

(75) Inventors: Daniel C. McGarry, Oxford, MI (US); Chester A. Huber, Grosse Pointe Farms, MI (US); Dwayne A. Crocker, Oxford, MI (US); Christopher L. Oesterling, Troy, MI (US); Jeffrey M. Stefan, Clawson, MI (US)

(73) Assignee: General Motors LLC, Detroit, MI (US)

( * ) Notice: Subject to any disclaimer, the term of this patent is extended or adjusted under 35 U.S.C. 154(b) by 2745 days.

(21) Appl. No.: 10/849,668

(22) Filed: May 20, 2004

(65) Prior Publication Data

US 2005/0273211 A1 Dec. 8, 2005

(51) Int. Cl.
G06F 7/00 (2006.01)
(52) U.S. Cl. ......................................... 701/36; 307/10.1
(58) Field of Classification Search .................. 701/200, 701/36; 307/10.1, 10.8; 340/534; 439/34, 439/49; 361/733
See application file for complete search history.

(56) References Cited

U.S. PATENT DOCUMENTS

| H0001837 | H  | * | 2/2000  | Fletcher et al. | ............... | 455/433    |
| 6,292,108 | B1 | * | 9/2001  | Straser et al.  | ............ | 340/870.11 |
| H0001921 | H  | * | 11/2000 | Fletcher et al. | ............... | 455/433    |
| 6,430,164 | B1 | * | 8/2002  | Jones et al.    | .................... | 370/313    |
| 6,625,169 | B1 | * | 9/2003  | Tofano          | .......................... | 370/466    |
| 6,965,593 | B2 | * | 11/2005 | Donahue et al.  | .............. | 370/352    |
| 6,965,816 | B2 | * | 11/2005 | Walker          | .......................... | 701/16     |
| 7,277,404 | B2 | * | 10/2007 | Tanzella et al. | ............... | 370/310    |
| 2002/0118638 | A1 | * | 8/2002  | Donahue et al.  | .............. | 370/229    |
| 2003/0012180 | A1 | * | 1/2003  | Donahue et al.  | .............. | 370/352    |
| 2003/0093187 | A1 | * | 5/2003  | Walker          | .............................. | 701/1      |
| 2004/0008652 | A1 | * | 1/2004  | Tanzella et al. | ............... | 370/338    |
| 2004/0117442 | A1 | * | 6/2004  | Thielen         | ......................... | 709/203    |
| 2005/0273211 | A1 | * | 12/2005 | McGarry et al.  | ................... | 701/1      |
| 2007/0127417 | A1 | * | 6/2007  | Kalika          | .......................... | 370/338    |

OTHER PUBLICATIONS

Real-Time Remote Onboard Diagnostics Using Embedded GPRS Surveillance Technology; Lin, C. E.; Shiao, Y.-S.; Li, C.-C.; Yang, S.-H.; Lin, S.-H.; Lin, C.-Y.; Vehicular Technology, IEEE Transactions on; vol. 56, Issue 3, May 2007 pp. 1108-1118; Digital Object Identifier 10.1109/TVT.2007.895602.*
Comparison of system availability in an electric vehicle with multi-plexed and non-multiplexed wiring harness; Masrur, M.A.; Garg, V.K.; Shen, J.; Richardson, P.; Vehicular Technology Conference, 2003. VTC 2003—Fall. 2003 IEEE $58_{th}$ ; vol. 5, Oct. 6-9, 2003 pp. 3277-3283 vol. 5; Digital Object Identifier 10.1109/VETECF.2003. 1286263.*
Applications of microsystems and signal processing for wiring integrity monitoring; Blemel, K.; Furse, C.; Aerospace Conference, 2001, IEEE Proceedings. vol. 7, Mar. 10-17, 2001, pp. 7-3253 vol. 7 ; Digital Object Identifier 10.1109/AERO.2001.931401.*

(Continued)

Primary Examiner — Cuong H Nguyen
(74) Attorney, Agent, or Firm — Anthony Luke Simon; Reising Ethington P.C.

(57) ABSTRACT

A system employing a vehicle module, and an intelligent connector in communication with the vehicle module implements a method for controlling the vehicle module. First, the intelligent connector receives a wireless transmission of a command signal. Second, the intelligent connector determines one or more control actions responsive to the command signal. Finally, the intelligent connector communicates one or more control signals indicative of the control action(s) to the vehicle module.

20 Claims, 5 Drawing Sheets

OTHER PUBLICATIONS

Fiber optic experience with the smart actuation system on the F-18 systems research aircraft; Zavala, E.; Digital Avionics Systems Conference, 1997. 16th DASC., AIAA/IEEE; vol. 2, Oct. 26-30, 1997 pp. 7.3-9-7.3-25 vol. 2 Digital Object Identifier 10.1109/DASC.1997.637239.*

A Low Cost Embedded Instrumentation (EI) Framework for Vehicle Health Management Systems (VHMS); Peter, F.E.; Blemel, K.G.; Aerospace Conference, 2008 IEEE; Mar. 1-8, 2008 pp. 1-5; Digital Object identifier 10.1109/AERO.2008.4526638.*

Mitigation and analysis of arc faults in automotive DC networks; Schoepf, T.J.; Naidu, M.; Gopalakrishnan; Electrical Contacts, 2003. Proceedings of the Forty-Ninth IEEE Holm Conference on; Sep. 8-10, 2003 pp. 163-171.*

42 V Powernet enabling technologies: overview; Hartnett, P.; Miller, P.; O'Hara, M.; Passenger Car Electrical Architecture (Ref. No. 2000/088) IEE Seminar; Jun. 21, 2000 pp. 1/1-1/4.*

IEEE Std 1725-2006 IEEE Standard for Rechargeable Batteries for Cellular Telephones; 2006 pp. 0_1-68.*

* cited by examiner

211

301

PROGRAMMABLE WIRELESS IN-LINE CONNECTOR

FIELD OF THE INVENTION

This invention relates generally to communications within a vehicle system. More specifically, the invention relates to a programmable wireless in-line connector.

BACKGROUND OF THE INVENTION

A wide variety of electronic devices communicate within modern vehicles. These communications often take place over a vehicle bus that operates to route signals between electronic modules within the vehicle system. However, communication with a module from outside of the vehicle system is difficult and has been undesirably limited. For example, the ability to affect vehicle bus operation has been constrained to direct instructions without the ability to route the signal based on the signal contents. To solve this limitation, smart cable protocol converters that are able to convert the format, or protocol, of the signal, have been used, but these converters merely translate a signal from one format into another format and do not actively determine a destination of the signal.

For example, use of a TTY (Text Telephony or Teletypewriter) devices via a cell phone has historically required an audio cable to allow modulated tones (between 1400 Hz and 1800 Hz) to pass through a voice channel after the call has been established. While such an approach is feasible for a cell phone user, telephony devices that are embedded in a vehicle, or otherwise inaccessible to a user, are unable to take advantage of such arrangements.

The present invention advances the state of the art in vehicle bus communications.

SUMMARY OF THE INVENTION

One form of the present invention is a system employing a vehicle module, and an intelligent connector in communication with the vehicle module. The intelligent connector includes a wireless transceiver operable to receive a wireless transmission of a command signal, and a controller operable to determine one or more control actions responsive to the command signal and to communicate one or more control signals indicative of the control action(s) to the vehicle module.

A second form of the invention provides a method for controlling a vehicle module. The method involves a reception of a wireless command signal, a determination of at least one vehicle module control action based on the received command signal, and a transmission of at least one control signal based on the determined vehicle module control action to the vehicle module.

A third form of the present invention is an intelligent connector employing a wireless transceiver operable to receive a wireless transmission of a command signal, and a controller operable to determine one or more control actions responsive to the command signal and to communicate one or more control signals indicative of the control action(s) to the vehicle module.

The aforementioned, and other features and advantages of the invention will become further apparent from the following detailed description of the presently preferred embodiments, read in conjunction with the accompanying drawings. The detailed description and drawings are merely illustrative of the invention rather than limiting, the scope of the invention being defined by the appended claims and equivalents thereof.

DETAILED DESCRIPTION OF THE DRAWINGS

Figure 1:
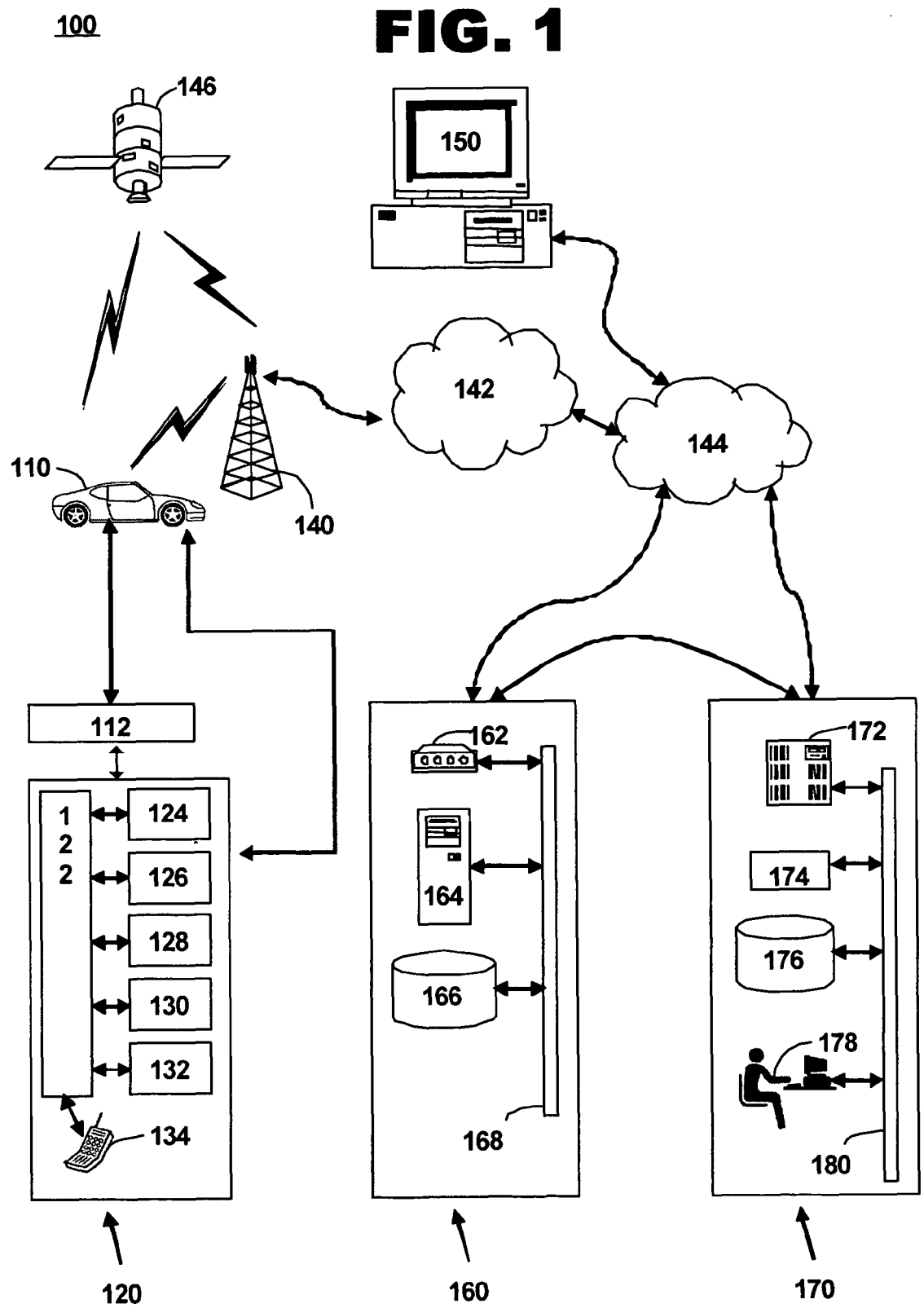
FIG. 1 illustrates an operating environment for a system for controlling vehicle modules.

FIG. 1 illustrates one embodiment of a mobile vehicle communication system ("MVCS") 100 for controlling vehicle modules. MVCS 100 includes a mobile vehicle communication unit ("MVCU") 110, a vehicle communication network 112, a telematics unit 120, one or more wireless carrier systems 140, one or more communication networks 142, one or more land networks 144, one or more satellite broadcast systems 146, one or more client, personal, or user computers 150, one or more web-hosting portals 160, and one or more call centers 170. In one embodiment, MVCU 110 is implemented as a mobile vehicle equipped with suitable hardware and software for transmitting and receiving voice and data communications. MVCS 100 may include additional components not relevant to the present discussion. Mobile vehicle communication systems and telematics units are known in the art.

MVCU 110 is also referred to as a mobile vehicle in the discussion below. In operation, MVCU 110 may be implemented as a motor vehicle, a marine vehicle, or as an aircraft. MVCU 110 may include additional components not relevant to the present discussion.

MVCU 110, via a vehicle communication network 112, sends signals to various units of equipment and systems (detailed below) within MVCU 110 to perform various functions such as unlocking a door, opening the trunk, setting personal comfort settings, and calling from telematics unit 120. These functions are performed by sending electronic instructions to a vehicle module configured to perform a certain task or function. In facilitating interactions among the various communication and electronic modules, vehicle communication network 112 utilizes network interfaces such as controller-area network, International Organization for Standardization ("ISO") Standard 9141, ISO Standard 11898 for high-speed applications, ISO Standard 11519 for lower speed applications, and Society of Automotive Engineers Standard J1850 for high-speed and lower speed applications.

MVCU 110, via telematics unit 120, sends to and receives radio transmissions from wireless carrier system 140. Wireless carrier system 140 is implemented as any suitable system for transmitting a signal from MVCU 110 to communication network 142.

Telematics unit 120 includes a processor 122 connected to a wireless modem 124, a global positioning system ("GPS") unit 126, an in-vehicle memory 128, a microphone 130, one or more speakers 132, and an embedded or in-vehicle mobile phone 134. In other embodiments, telematics unit 120 may be implemented without one or more of the above listed components such as, for example, speakers 132. Telematics unit 120 may include additional components not relevant to the present discussion. Telematics unit 120 is one example of a vehicle module.

In one embodiment, processor 122 is implemented as a microcontroller, controller, host processor, or vehicle communications processor. In one embodiment, processor 122 is a digital signal processor. In an example, processor 122 is implemented as an application specific integrated circuit. In another embodiment, processor 122 is implemented as a processor working in conjunction with a central processing unit performing the function of a general purpose processor. GPS unit 126 provides longitude and latitude coordinates of the vehicle responsive to a GPS broadcast signal received from one or more GPS satellite broadcast systems (not shown). In-vehicle mobile phone 134 is a cellular-type phone such as, for example, a digital, dual-mode (e.g., analog and digital), dual-band, multi-mode or multi-band cellular phone.

Processor 122 executes various computer programs that control programming and operational modes of electronic and mechanical systems within MVCU 110. Processor 122 controls communications (e.g., call signals) between telematics unit 120, wireless carrier system 140, and call center 170. Additionally, processor 122 controls reception of communications from satellite broadcast system 146. In one embodiment, a voice-recognition application is installed in processor 122 that can translate human voice input through microphone 130 to digital signals. Processor 122 generates and accepts digital signals transmitted between telematics unit 120 and a vehicle communication network 112 that is connected to various electronic modules in the vehicle. In one embodiment, these digital signals activate the programming mode and operation modes, as well as provide for data transfers such as, for example, data over voice channel communication. In this embodiment, signals from processor 122 are translated into voice messages and sent out through speaker 132.

Wireless carrier system 140 is a wireless communications carrier or a mobile telephone system and transmits to and receives signals from one or more MVCU 110. Wireless carrier system 140 incorporates any type of telecommunications in which electromagnetic waves carry signal over part of or the entire communication path. In one embodiment, wireless carrier system 140 is implemented as any type of broadcast communication in addition to satellite broadcast system 146. In another embodiment, wireless carrier system 140 provides broadcast communication to satellite broadcast system 146 for download to MVCU 110. In an example, wireless carrier system 140 connects communication network 142 to land network 144 directly. In another example, wireless carrier system 140 connects communication network 142 to land network 144 indirectly via satellite broadcast system 146.

Satellite broadcast system 146 transmits radio signals to telematics unit 120 within MVCU 110. In one embodiment, satellite broadcast system 146 may broadcast over a spectrum in the "S" band of 2.3 GHz that has been allocated by the U.S. Federal Communications Commission for nationwide broadcasting of satellite-based Digital Audio Radio Service.

In operation, broadcast services provided by satellite broadcast system 146 are received by telematics unit 120 located within MVCU 110. In one embodiment, broadcast services include various formatted programs based on a package subscription obtained by the user and managed by telematics unit 120. In another embodiment, broadcast services include various formatted data packets based on a package subscription obtained by the user and managed by call center 170. In an example, processor 122 implements data packets received by telematics unit 120. In another example, data packets received by telematics unit 120 are communicated (see FIG. 2 and discussion, below) to modified MVCUs within the MVCS.

Communication network 142 includes services from one or more mobile telephone switching offices and wireless networks. Communication network 142 connects wireless carrier system 140 to land network 144. Communication network 142 is implemented as any suitable system or collection of systems for connecting wireless carrier system 140 to MVCU 110 and land network 144.

Land network 144 connects communication network 142 to client computer 150, web-hosting portal 160, and call center 170. In one embodiment, land network 144 is a public-switched telephone network. In another embodiment, land network 144 is implemented as an Internet protocol ("IP") network. In other embodiments, land network 144 is implemented as a wired network, an optical network, a fiber network, other wireless networks, or any combination thereof. Land network 144 is connected to one or more landline telephones. Communication network 142 and land network 144 connect wireless carrier system 140 to web-hosting portal 160 and call center 170.

Client, personal, or user computer 150 includes a computer usable medium to execute Internet browser and Internet-access computer programs for sending and receiving data over land network 144 and, optionally, wired or wireless communication networks 142 to web-hosting portal 160. Personal or client computer 150 sends user preferences to web-hosting portal 160 through a web-page interface using communication standards such as hypertext transport protocol, and transport-control protocol and Internet protocol. In one embodiment, the data includes directives to change certain programming and operational modes of electronic and mechanical systems within MVCU 110.

In operation, a client utilizes computer 150 to initiate setting or re-setting of user preferences for MVCU 110. In an example, a client utilizes computer 150 to provide radio station presets as user preferences for MVCU 110. User-preference data from client-side software is transmitted to server-side software of web-hosting portal 160. In an example, user-preference data is stored at web-hosting portal 160.

Web-hosting portal 160 includes one or more data modems 162, one or more web servers 164, one or more databases 166, and a network system 168. Web-hosting portal 160 is connected directly by wire to call center 170, or connected by phone lines to land network 144, which is connected to call center 170. In an example, web-hosting portal 160 is connected to call center 170 utilizing an IP network. In this example, both components, web-hosting portal 160 and call center 170, are connected to land network 144 utilizing the IP network. In another example, web-hosting portal 160 is connected to land network 144 by one or more data modems 162. Land network 144 sends digital data to and receives digital data from modem 162, data that is then transferred to web server 164. Modem 162 may reside inside web server 164. Land network 144 transmits data communications between web-hosting portal 160 and call center 170.

Web server 164 receives user-preference data from user computer 150 via land network 144. In alternative embodiments, computer 150 includes a wireless modem to send data to web-hosting portal 160 through a wireless communication network 142 and a land network 144. Data is received by land network 144 and sent to one or more web servers 164. In one embodiment, web server 164 is implemented as any suitable hardware and software capable of providing web services to help change and transmit personal preference settings from a client at computer 150 to telematics unit 120 in MVCU 110. Web server 164 sends to or receives from one or more databases 166 data transmissions via network system 168. Web server 164 includes computer applications and files for managing and storing personalization settings supplied by the client, such as door lock/unlock behavior, radio station preset selections, climate controls, custom button configurations and theft alarm settings. For each client, the web server potentially stores hundreds of preferences for wireless vehicle communication, networking, maintenance and diagnostic services for a mobile vehicle.

In one embodiment, one or more web servers 164 are networked via network system 168 to distribute user-preference data among its network components such as database 166. In an example, database 166 is a part of or a separate computer from web server 164. Web server 164 sends data transmissions with user preferences to call center 170 through land network 144.

Call center 170 is a location where many calls are received and serviced at the same time, or where many calls are sent at the same time. In one embodiment, the call center is a telematics call center, facilitating communications to and from telematics unit 120 in MVCU 110. In an example, the call center is a voice call center, providing verbal communications between an advisor in the call center and a subscriber in a mobile vehicle. In another example, the call center contains each of these functions. In other embodiments, call center 170 and web-hosting portal 160 are located in the same or different facilities.

Call center 170 contains one or more voice and data switches 172, one or more communication services managers 174, one or more communication services databases 176, one or more communication services advisors 178, and one or more network systems 180.

Switch 172 of call center 170 connects to land network 144. Switch 172 transmits voice or data transmissions from call center 170, and receives voice or data transmissions from telematics unit 120 in MVCU 110 through wireless carrier system 140, communication network 142, and land network 144. Switch 172 receives data transmissions from and sends data transmissions to one or more web-hosting portals 160. Switch 172 receives data transmissions from or sends data transmissions to one or more communication services managers 174 via one or more network systems 180.

Communication services manager 174 is any suitable hardware and software capable of providing requested communication services to telematics unit 120 in MVCU 110. Communication services manager 174 sends to or receives from one or more communication services databases 176 data transmissions via network system 180. Communication services manager 174 sends to or receives from one or more communication services advisors 178 data transmissions via network system 180. Communication services database 176 sends to or receives from communication services advisor 178 data transmissions via network system 180. Communication services advisor 178 receives from or sends to switch 172 voice or data transmissions.

Communication services manager 174 provides one or more of a variety of services including initiating data over voice channel wireless communication, enrollment services, navigation assistance, directory assistance, roadside assistance, business or residential assistance, information services assistance, emergency assistance, and communications assistance. Communication services manager 174 receives service-preference requests for a variety of services from the client via computer 150, web-hosting portal 160, and land network 144. Communication services manager 174 transmits user-preference and other data such as, for example primary diagnostic script to telematics unit 120 in MVCU 110 through wireless carrier system 140, communication network 142, land network 144, voice and data switch 172, and network system 180. Communication services manager 174 stores or retrieves data and information from communication services database 176. Communication services manager 174 may provide requested information to communication services advisor 178.

In one embodiment, communication services advisor 178 is implemented as a real advisor. In an example, a real advisor is a human being in verbal communication with a user or subscriber (e.g., a client) in MVCU 110 via telematics unit 120. In another embodiment, communication services advisor 178 is implemented as a virtual advisor. In an example, a virtual advisor is implemented as a synthesized voice interface responding to requests from telematics unit 120 in MVCU 110.

Communication services advisor 178 provides services to telematics unit 120 in MVCU 110. Services provided by communication services advisor 178 include enrollment services, navigation assistance, real-time traffic advisories, directory assistance, roadside assistance, business or residential assistance, information services assistance, emergency assistance, automated vehicle diagnostic function, and communications assistance. Communication services advisor 178 communicates with telematics unit 120 in MVCU 110 through wireless carrier system 140, communication network 142, and land network 144 using voice transmissions, or through communication services manager 174 and switch 172 using data transmissions. Switch 172 selects between voice transmissions and data transmissions.

In operation, an incoming call is routed to telematics unit 120 within mobile vehicle 110 from call center 170. In one embodiment, the call is routed to telematics unit 120 from call center 170 via land network 144, communication network 142, and wireless carrier system 140. In another embodiment, an outbound communication is routed to telematics unit 120 from call center 170 via land network 144, communication network 142, wireless carrier system 140 and satellite broadcast system 146. In this embodiment, an inbound communication is routed to call center 170 from telematics unit 120 via wireless carrier system 140, communication network 142, and land network 144.

Figure 2:
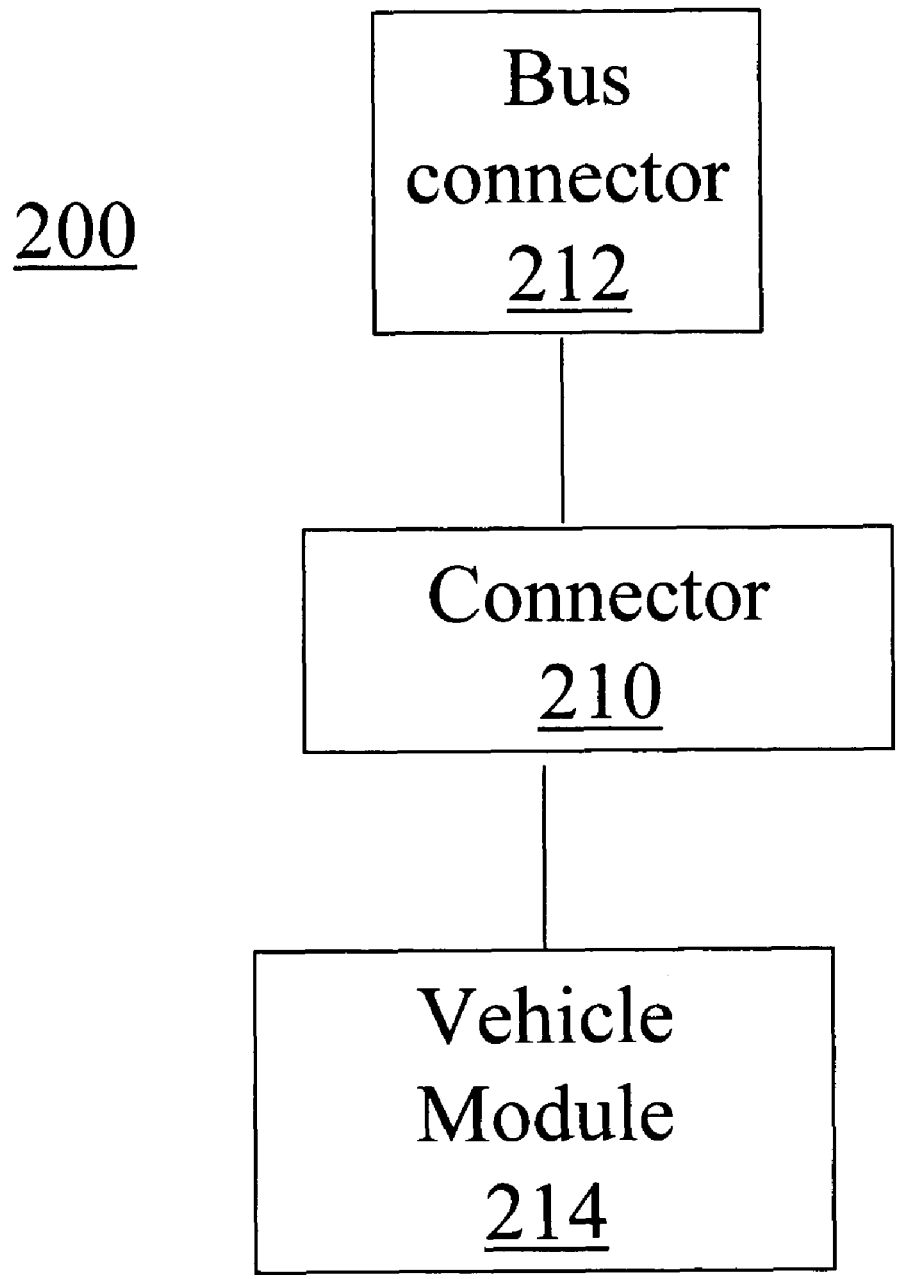
FIG. 2 illustrates a block diagram of one embodiment of a system for controlling vehicle modules in accordance with the present invention.

FIG. 2 shows a system 200 for controlling vehicle modules, where system 200 employs a conventional bus connector 212, a new and unique intelligent connector 210 and one or more conventional vehicle modules 214 as shown. Bus connector 212 is any interface operable to establish communication between connector 210 and a vehicle bus (not shown). In one embodiment, the vehicle bus is implemented as a vehicle communication network 112 as illustrated in FIG. 1. Vehicle module(s) 214 are any electronic module operable to affect the operation or use of a vehicle, such as, for example, a braking module, audiovisual module (such as a television, radio, media player, DVD player, CD player, satellite radio player, etc.), lighting module or other electronic module configured to affect vehicle operation. In one embodiment, one of the vehicle modules 214 is telematics unit 120 as illustrated in FIG. 1.

Figure 3:
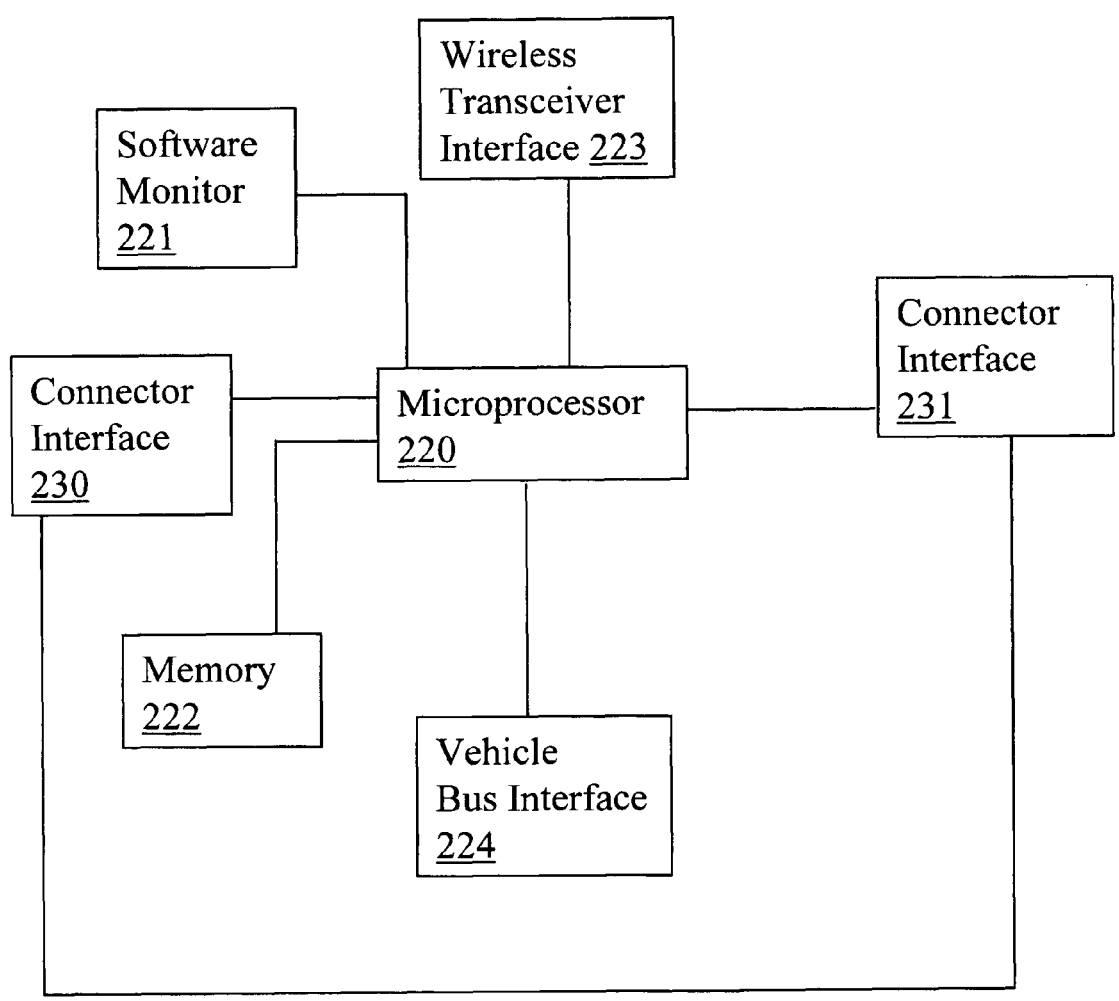
FIG. 3 illustrates a block diagram of one embodiment in accordance with the present invention of a connector illustrated in FIG. 2.

Connector 210 is any type of connector operable to provide an intelligent connection between bus connector 212 and vehicle module(s) 214. FIG. 3 illustrates one embodiment 211 of connector 210, which employs a microprocessor 220 in communication with a software monitor 221, a memory 222, a wireless transceiver interface 223, a vehicle bus interface 224, and a pair of connector interfaces 230, 231. Connector 211 may be configured for snap connection into the line between bus connector 212 (FIG. 2) and module(s) 214 (FIG. 2), or configured as a pigtail. In embodiments wherein connector 211 is configured as a pigtail, connector 211 will employ discrete wires connecting bus 212 and module(s) 214, while allowing for logical messages to be issued from the vehicle bus via bus connector 212.

Microprocessor 220, software monitor 221 and a memory 222 constitutes a controller. Microprocessor 220 may be implemented as any appropriate processor, such as a processor similar to processor 122 shown in FIG. 1. In one embodiment, the same processor serves as processor 122 and processor 220. Connector interfaces 230, 231 provide communication with vehicle module(s) 214, and to bus connector 212. Software monitor 221 affects the behavior of microprocessor 220 and the connected components. Memory 222 is associated with microprocessor 220 and provides storage for data to be processed by microprocessor 220. Memory 222 is implemented as any known memory system, including but not limited to removable or permanent media. In one embodiment, the connector interfaces 230, 231 contain an interface to discrete wires that affect the behavior of vehicle systems such as, for example, wires that control vehicle audio channels.

Wireless transceiver interface 223 is operable to be in communication with a wireless transceiver (not shown) external to connector 211 to transfer communications between microprocessor 220 and the external wireless transceiver. In one embodiment, the external wireless transceiver utilizes a short range communication protocol such as, for example, 802.11 series or Bluetooth® as is known in the art. In an example, the short range wireless communication protocol is an 802.11 series such as, for example, Wi-Fi, direct-sequence spread spectrum, frequency-hopping spread spectrum, or shared wireless access protocol. In another example, the short range communication protocol is any other FCC Part 15 protocol.

Vehicle bus interface 224 is in communication with the vehicle bus and is operable to transfer communications between microprocessor 220 and the vehicle bus.

Connector interfaces 230 and 232 connect bus interface 212 and vehicle modules 214, respectively, to connector 211.

Figure 4:
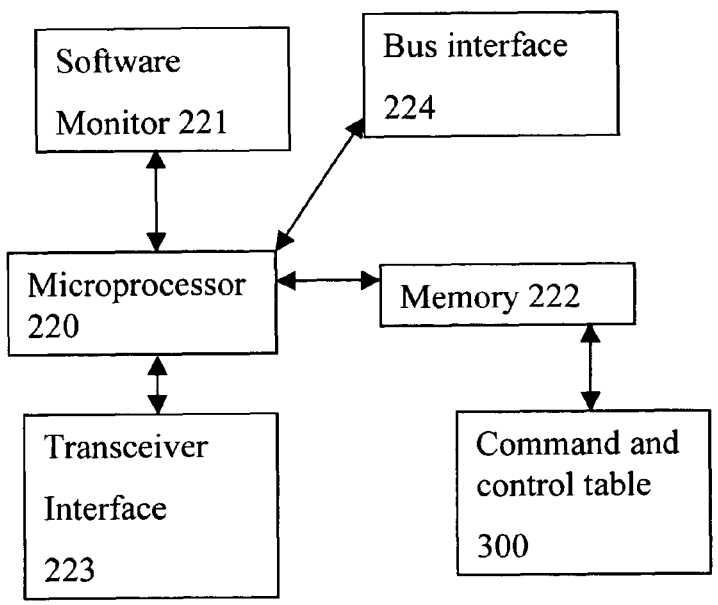
FIG. 4 illustrates a block diagram of a logical operation of the connector embodiment illustrated in FIG. 3.
Figure 5:
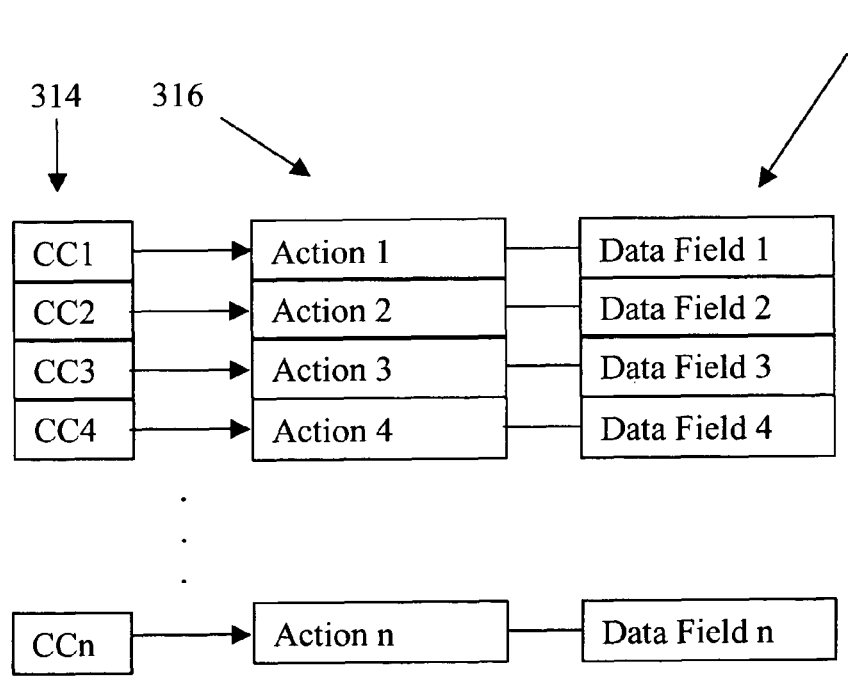
FIG. 5 illustrates a block diagram of one embodiment in accordance with the present invention of a command and control table illustrated in FIG. 4.

FIG. 4 illustrates an operational relationship between microprocessor 220 and memory 222 where memory 222 is linked to a command and control table 300, and FIG. 5 illustrates one embodiment 301 of a command and control table 300. Command and control table 301 is a programmable table linking actions 316 with data fields 318 to determine an appropriate action to be taken given a particular command 314. In one embodiment as shown in FIG. 4, a command CC1 is linked with action 1 and data field 1, a command CC2 is linked with action 2 and data field 2, and so on and so on for n table entries. In alternative embodiments, each command may be linked to a plurality of actions and corresponding data fields.

Command and control table 301 is programmable by a user, or by call center 170 (FIG. 1). Users may program table 301 using a laptop, PDA, web interface, wireless keypad or any other input device. For example, a user may program the table 301 to associate an action to display a dialed phone number on an audiovisual display in response to such command and control action 316. In another example, a user may program table 301 to record (in data 318) the number of times the vehicle is started by counting the number of ignition signals (i.e. action 316) that travel across the bus. In another example, the telematics unit 120 (FIG. 1) may be programmed to be dialed with a wireless TTY unit, and to transmit TTY signals received from a call center 170 (FIG. 1) to the wireless TTY unit. In another example, wheel speed is collected by a module and sent through the connector to the processor, recorded (again, in data 318) and sent to an odometer module for determination of distance traveled, and additionally sent to a navigational module for aid in navigation.

Referring to FIGS. 4 and 5, in operation, software monitor 221 resident within microprocessor 220 receives command and control information via a short range wireless transceiver interface 223. The software monitor 221 accesses memory 222 and the command and control table 301. Each command and control table entry includes the criteria that when met, trigger an associated action 316 or set of actions. The command and control table may store data 318 to be utilized in performance of the action 316. In one embodiment, wireless transceiver interface 223 includes hardware to control audio arbitration, while in other embodiments this hardware is included in a short range wireless transceiver (not illustrated).

For example, a wireless keypad sends a command and control signal, such as a phone number, to a wireless transceiver communicating with wireless transceiver interface 223. The wireless transceiver interface 223 accesses memory 222 for the appropriate action for a phone number input, and stores the phone number in data 318. In this example, the action 316 to be taken for a phone number is to dial the phone number using the telematics unit (120 of FIG. 1). In another example, the action 316 further includes an instruction to display the phone number on a radio head unit of an audio-visual module. In another example, software monitor 221 'listens' for a certain message to be relayed upon a bus in communication with bus interface 310, and counts the number of times the message is relayed, storing the number in data 318. In yet another example, wheel speed bus messages and odometer bus messages are detected, and relayed via the wireless transceiver interface 223 to a wireless transceiver to communicate the messages to a navigational device to aid in navigational services.

The connector described herein functions both actively and passively. Thus, a message may be passively passed from the module interface directly to the bus interface, while another message is actively processed prior to forwarding the message to its intended recipient module. Actively processing the message may involve adding additional actions or recipients of the message and routing to the new destination, storing information relating to the message, or any other action taken in response to a command and control table entry. The connector is configured to monitor and influence behavior of the modules connected to the vehicle bus.

Figure 6:
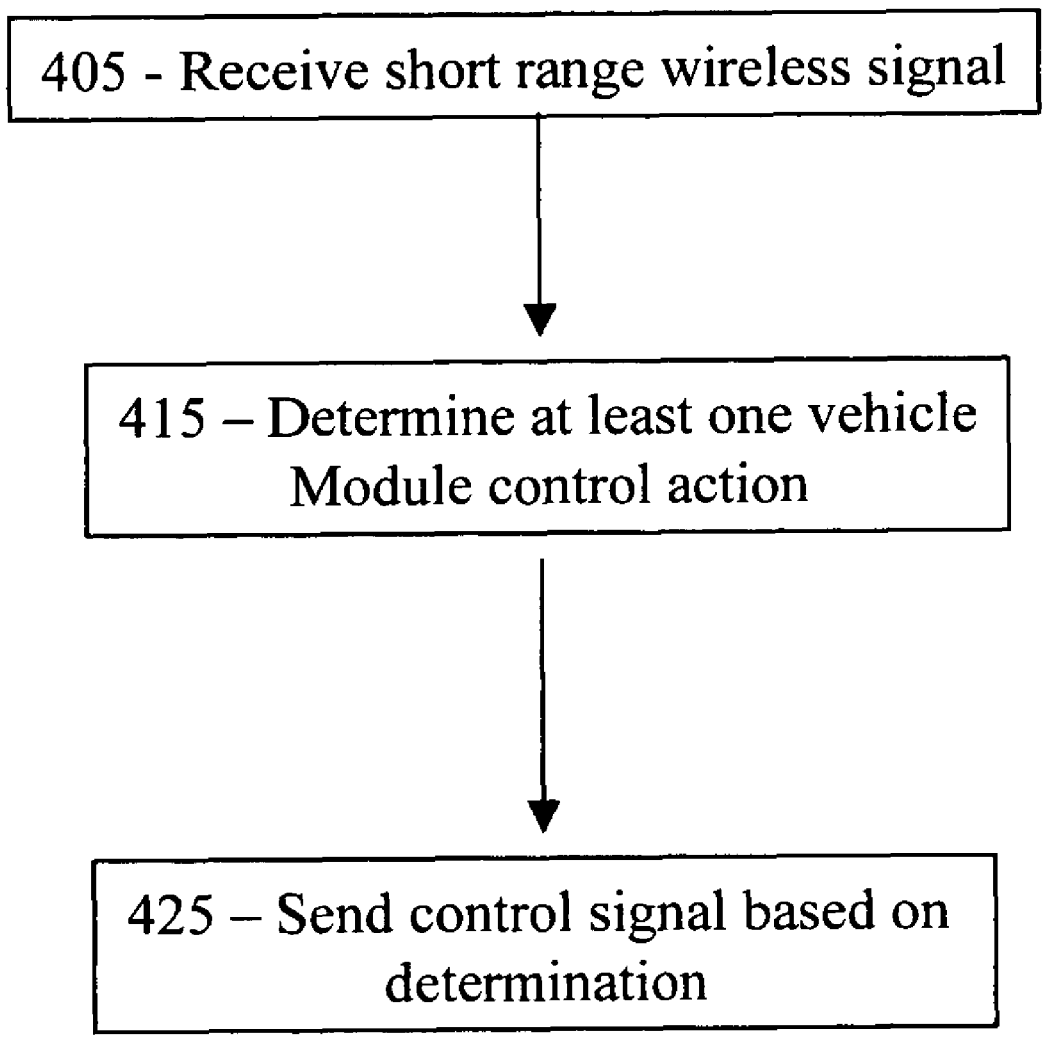
FIG. 6 illustrates a flowchart representative of one embodiment of a method of controlling vehicle modules in accordance with the present invention

FIG. 6 illustrates one embodiment of a method 400 for controlling vehicle modules. Method 400 operates using two signal types—command and control. Command signals are directing the electronic system to perform a particular task, and command signals are received by the wireless transceiver. Control signals are signals generated by the system to affect the operation of at least one electronic module. Method 400 begins at a stage 405 when a short range wireless command signal is received. The short range wireless command signal, in one embodiment, is received at a short range wireless transceiver, such as, for example, a transceiver communicating with the transceiver interface 223 described with respect to FIG. 3. The command signal is any signal intended to have a desired effect on at least one vehicle module. For example, the command signal may be intended to dial a TTY phone number, and display the TTY number on a display screen of an audiovisual vehicle module. The command signal is then transferred to the microprocessor.

At a stage 415, at least one vehicle module control action is determined based on the received command signal. The vehicle module control action results in a determination of what action should be taken by at least one vehicle module. For example, based on the received command signal, the method may determine that the telematics unit should dial a TTY telephone number, as well as display the number to be dialed on a display screen of an audiovisual vehicle module. In one example, the determination is made by the microprocessor 220 with reference to command and control table 301 described in FIGS. 4 and 5. The received command signal may constitute a signal from a control device. The control device may be any device configured to send a wireless signal, including TTY devices, keypads, computers, PDA devices and navigational devices.

At a stage 425, at least one control signal based on the determined vehicle module control action is transmitted to the vehicle module. The at least one control signal is sent to at least one vehicle module to effect the desired action. Thus, one control signal, in the above example, is sent to the telematics unit to dial the TTY number, and a second control signal is sent to the audiovisual system to display the TTY number on a display screen of an audiovisual vehicle module.

In another example, a short-range wireless connection node is installed with a 2.5 mm audio jack, or another standard jack such as RCA, ¼" or ⅛", for connecting the TTY device to establish a link to a wireless transceiver in communication with a telematics unit. Upon connection, the communicating short-range wireless nodes establish a digital audio link to pass TTY tones over the wireless link and to the wireless TTY device. Such short-range wireless connection may entail use of any short-range wireless protocol, such as those disclosed above, including Bluetooth.

The present invention may be embodied in other specific forms without departing from its spirit or essential characteristics. The described embodiments are to be considered in all respects only as illustrative and not restrictive.

What is claimed is:

1. A system, comprising:
    a vehicle module; and
    an intelligent connector in communication with the vehicle module, wherein the intelligent connector includes
    a wireless transceiver operable to receive a wireless transmission of a command signal, and
    a controller operable to determine a control action responsive to the command signal and to communicate a control signal indicative of the control action to the vehicle module.

2. The system of claim 1, wherein the controller includes:
    a microprocessor; and
    a memory device connected to the microprocessor.

3. The system of claim 2, wherein the memory device is operable to store a predetermined list of command and control instructions.

4. The system of claim 2, wherein the controller includes a software monitor connected to the microprocessor to thereby affect an operation of the microprocessor.

5. The system of claim 1, wherein the intelligent connector further includes a vehicle module interface in communication with the controller to facilitate the communication of the control signal to the vehicle module.

6. The system of claim 1, wherein the vehicle module is one of an audiovisual system, a brake system, a wheel system, a lighting system, or a telematics unit.

7. The system of claim 1, wherein the wireless transceiver is operable to receive the command signal from at least one of a TTY device, a keypad, a computer, a PDA device, and a navigational device.

8. The system of claim 1, wherein the wireless command signal is compliant with at least one of a 802.11 protocol, a Bluetooth® protocol, a Wi-Fi protocol, a direct-sequence spread spectrum protocol, a frequency-hopping spread spectrum protocol, a shared wireless access protocol, and any other FCC Part 15 protocol.

9. A method for controlling a vehicle module, the method comprising:
    receiving a wireless command signal;
    determining a vehicle module control action based on the received command signal;
    transmitting a control signal based on the determined vehicle module control action to the vehicle module.

10. The method of claim 9, wherein the vehicle module is one of an audiovisual system, a brake system, a wheel system, a lighting system, body control system, powertrain control system, and a telematics unit.

11. The method of claim 9, wherein the command signal is received from one of a TTY device, a keypad, a computer, a PDA device, or a navigational device.

12. The method of claim 9, wherein the wireless command signal is compliant with at least one of a 802.11 protocol, a Bluetooth® protocol, a Wi-Fi protocol, a direct-sequence spread spectrum protocol, a frequency-hopping spread spectrum protocol, a shared wireless access protocol, and any other FCC Part 15 protocol.

13. An intelligent connector, comprising:
    a wireless transceiver operable to receive a wireless transmission of a command signal; and
    a controller operable to determine a control action responsive to the command signal and to communicate the control signal indicative of the control action to a vehicle module.

14. The intelligent connector of claim 13, wherein the controller includes:
    a microprocessor; and
    a memory device connected to the microprocessor.

15. The intelligent connector of claim 14, wherein the memory device is operable to store a predetermined list of command and control instructions.

16. The intelligent connector of claim 14, wherein the controller includes a software monitor connected to the microprocessor to thereby affect an operation of the microprocessor.

17. The intelligent connector of claim 13, further comprising:
    a vehicle module interface in communication with the controller to facilitate the communication of the control signal to the vehicle module.

18. The intelligent connector of claim 13, wherein the vehicle module is one of an audiovisual system, a brake system, a wheel system, a lighting system, body control system, powertrain control system, or a telematics unit.

19. The intelligent connector of claim 13, wherein the wireless transceiver is operable to receive the command signal from at least one of a TTY device, a keypad, a computer, a PDA device, and a navigational device.

20. The intelligent connector of claim 13, wherein the wireless command signal is compliant with at least one of a 802.11 protocol, a Bluetooth® protocol, a Wi-Fi protocol, a direct-sequence spread spectrum protocol, a frequency-hopping spread spectrum protocol, a shared wireless access protocol, and any other FCC Part 15 protocol.

* * * * *